(12) United States Patent
Klemenz et al.

(10) Patent No.: US 8,880,561 B2
(45) Date of Patent: Nov. 4, 2014

(54) COMPUTER SYSTEM AND COMPUTERIZED METHOD FOR STORING BUSINESS OBJECTS AND BUSINESS MAPPING DATA

(75) Inventors: Oliver Klemenz, Heidelberg (DE); Diego Ricardo Rapela, Ladenburg (DE)

(73) Assignee: SAP SE, Walldorf (DE)

( * ) Notice: Subject to any disclaimer, the term of this patent is extended or adjusted under 35 U.S.C. 154(b) by 165 days.

(21) Appl. No.: 13/333,762

(22) Filed: Dec. 21, 2011

(65) Prior Publication Data

US 2013/0166610 A1 Jun. 27, 2013

(51) Int. Cl.
*G06F 7/00* (2006.01)

(52) U.S. Cl.
USPC .......................................... 707/802

(58) Field of Classification Search
USPC ............ 707/802, 822, 999.002, 602, 999.101
See application file for complete search history.

(56) References Cited

U.S. PATENT DOCUMENTS

| | | | |
|---|---|---|---|
| 6,621,505 B1 * | 9/2003 | Beauchamp et al. | 715/764 |
| 6,990,636 B2 * | 1/2006 | Beauchamp et al. | 715/764 |
| 7,937,410 B2 * | 5/2011 | Steinmaier et al. | 707/802 |
| 8,239,820 B1 * | 8/2012 | White et al. | 717/101 |
| 2003/0058277 A1 * | 3/2003 | Bowman-Amuah | 345/765 |
| 2005/0091093 A1 * | 4/2005 | Bhaskaran et al. | 705/7 |
| 2006/0048097 A1 * | 3/2006 | Doshi | 717/120 |
| 2007/0016429 A1 * | 1/2007 | Bournas et al. | 705/1 |
| 2008/0208670 A1 * | 8/2008 | Goldszmidt et al. | 705/8 |
| 2009/0113378 A1 * | 4/2009 | Boyer et al. | 717/101 |
| 2009/0150478 A1 * | 6/2009 | Xu et al. | 709/203 |
| 2009/0326988 A1 * | 12/2009 | Barth et al. | 705/4 |
| 2010/0082497 A1 * | 4/2010 | Biesemann et al. | 705/301 |
| 2010/0174583 A1 * | 7/2010 | Passova et al. | 705/10 |
| 2010/0312851 A1 * | 12/2010 | Jackson et al. | 709/217 |
| 2010/0318370 A1 * | 12/2010 | Bhattacharyya et al. | 705/1.1 |
| 2011/0161942 A1 * | 6/2011 | Brunswig et al. | 717/143 |
| 2011/0276968 A1 * | 11/2011 | Kand et al. | 718/102 |
| 2013/0014080 A1 * | 1/2013 | Brunswig et al. | 717/102 |

* cited by examiner

*Primary Examiner* — Mohammed R Uddin
(74) *Attorney, Agent, or Firm* — Fountainhead Law Group PC (57) ABSTRACT

A computerized method for accessing a business object for a user defined process includes receiving at a computer system a request for generation of a user process for access to a business object, and generating via the computer system an SADL (Service Adaptation Definition Language) from a data mapping of business object data of the business object, wherein the data mapping includes a mapping of the data mapping. The computer method further includes generating via the computer system a plurality of artifacts to support the user process, wherein the SADL file is an artifact for designing the user process at a design time and for run time execution of the user process.

20 Claims, 11 Drawing Sheets

COMPUTER SYSTEM AND COMPUTERIZED METHOD FOR STORING BUSINESS OBJECTS AND BUSINESS MAPPING DATA

BACKGROUND

The present invention relates to computers processes added to existing network processes, and in particular relates to processes added by customers to existing network-business processes for business object access and modification.

Unless otherwise indicated herein, the approaches described in this section are not prior art to the claims in this application and are not admitted to be prior art by inclusion in this section.

Computer systems that provide data hosting and applications that operate on hosted data are becoming increasingly popular. Businesses, government entities, and other organizations (generally referred to as users herein) with relatively large bodies of data are increasingly using such computer systems to host their data. Such computer system are typically maintained and operated by businesses that are independent from the users that contract with the businesses for the use of such computer systems for hosting data. Computer systems configured to host data and provide applications for the hosted data provide numerous advantages for users, such as: reducing user-overhead costs, providing reliable access to hosted data via a variety of computer platforms (e.g., desktop computers, laptop computers, tablet computers, etc.), global access to hosted data, a large variety of applications available for the hosted data, and the like.

While a variety of applications are often provided by businesses offering computer systems for hosting data, users using computers systems for data hosting often require processes (generally referred to as user processes herein) that are not provided by the computer systems. Businesses offering computers systems for hosting data typically have limited resources for developing and maintaining specific user processes for the numerous users who desire user processes that are not provided by the computer systems. Further, developing user processes is typically complicated where a relatively large variety of artifacts need to be created to create and execute the user processes. Small and medium size users (e.g., small and medium size businesses) that want to generate user processes often do not have adequate resources for developing, implementing, and maintaining such user processes.

Thus, there is a need for providing improved computer system that are configured to provide computerized tools that provide for users to develop user processes that integrate with existing applications offered by the computer system. It is desirable that the computerized tools are configured to allow users to develop user processes, use the user processes with the user's hosted data, and maintain the user processes for the "life" of the user processes. There is a further need that computerized tools for generating user processes generate and maintain the artifacts needed for supporting the user processes where the user may not be aware that artifacts are being created and used for the user processes.

SUMMARY

The present invention relates to processes added to existing network applications, and in particular relates to user processes added by customers to existing network-business applications for business object access and modification.

According to one embodiment of the present invention, a computerized method for accessing a business object for a user defined process includes receiving at a computer system a request for generation of a user process for access to a business object, and generating via the computer system an SADL (Service Adaptation Definition Language) from a data mapping of business object data of the business object, wherein the data mapping includes a mapping of the data mapping. The method further includes generating via the computer system a plurality of artifacts to support the user process, wherein the SADL file is an artifact for designing the user process at a design time and for run time execution of the user process.

According to a specific embodiment, the method further includes packing via the computer system a message at a run time of the user process according to the data mapping of the SADL file.

According to another specific embodiment, the packing step includes packing the message via a process agent operating according to the mapping of the SADL file.

According to another specific embodiment, the process agent is generated via the computer system without user input at a design time.

According to another specific embodiment, the SADL file is an XML file.

According to another specific embodiment, the user process is for printing the business object data via a front-end printing or a backend printing.

According to another specific embodiment, the method further includes receiving at the computer system a user selection for a print form for the user process.

According to another specific embodiment, the method further includes receiving at the computer system a user selection of a data mapping from source/sending business object to the business object. The business object is a target/receiving business object. The method further includes generating via the computer system a second SADL file from the data mapping for a first data mapping of source/second business object data of a source business object to a message. The step of generating the first mentioned SADL includes generating via the computer system a second SADL file from the data mapping for a second data mapping of the source/second business object data in the message to the target/receiving business object, wherein the second data mapping includes information for a hierarchical structure of the target/receiving business object. The first data mapping and the second data mapping include mappings of the data mapping.

According to another specific embodiment, the second SADL file is an artifact for designing the user process at the design time and for the run time execution of the user process.

According to a specific embodiment, the method further includes packing via the computer system a message at a run time of the user process according to the first data mapping of the first SADL file, and unpacking via the computer system the message at the run time of the user process according to the second data mapping of the second SADL file.

According to another specific embodiment, the packing step includes packing the message via a process agent operating according to the first mapping of the first SADL file.

According to another specific embodiment, the process agent is generated via the computer system without user input at a design time.

According to another specific embodiment, the unpacking step includes unpacking the message via a process agent operating according to the second mapping of the second SADL file.

According to another specific embodiment, the unpacking step includes accessing the target/receiving business object for accessing the target/receiving business object data.

According to another specific embodiment, the unpacking step includes accessing the target/receiving business object for modifying the target business object data with the source/sending business object data in the message.

According to another specific embodiment, the second SADL file specifies a hierarchical mapping of the source/sending business object data in the message to a hierarchical structure of the target/receiving business object.

According to another specific embodiment, the first SADL file is a first XML file, and the second SADL file is a second XML file.

According to another specific embodiment, the method further includes displaying via the computer system a structure of the source/sending business object and a structure for the target/receiving business object for user selection of the source/second business object data and the target/receiving business object date for mapping the source/sending business object data to the target/receiving business object date.

According to another embodiment, a non-transitory computer readable medium comprises a computer program product, which includes steps for a computerized method including: receiving at a computer system a request for generation of a user process for access to a business object, and generating via the computer system an SADL (Service Adaptation Definition Language) from a data mapping of business object data of the business object, wherein the data mapping includes a mapping of the data mapping. The steps of the method further includes generating via the computer system a plurality of artifacts to support the user process, wherein the SADL file is an artifact for designing the user process at a design time and for run time execution of the user process.

According to one embodiment of the present invention, a computer system configured to design and execution of a user defined process includes a processor configured to execute computer code, and a memory coupled configured to store computer code and transfer the computer code to the processor for execution. The computer code includes code for receiving a request for generation of a user process for access to a business object, and code for generating via the computer system an SADL (Service Adaptation Definition Language) from a data mapping of business object data of the business object, wherein the data mapping includes a mapping of the data mapping. The computer code further includes code for generating a plurality of artifacts to support the user process, wherein the SADL file is an artifact for designing the user process at a design time and for run time execution of the user process.

The following detailed description and accompanying drawings provide a better understanding of the nature and advantages of the present invention.

DETAILED DESCRIPTION

The present invention generally provides a computer system and a computerized method for integrating user processes with existing applications, and in particular relates to integrating user processes developed by users with existing business applications for a variety of use cases where business objects are accessed and/or modified by the user processes.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
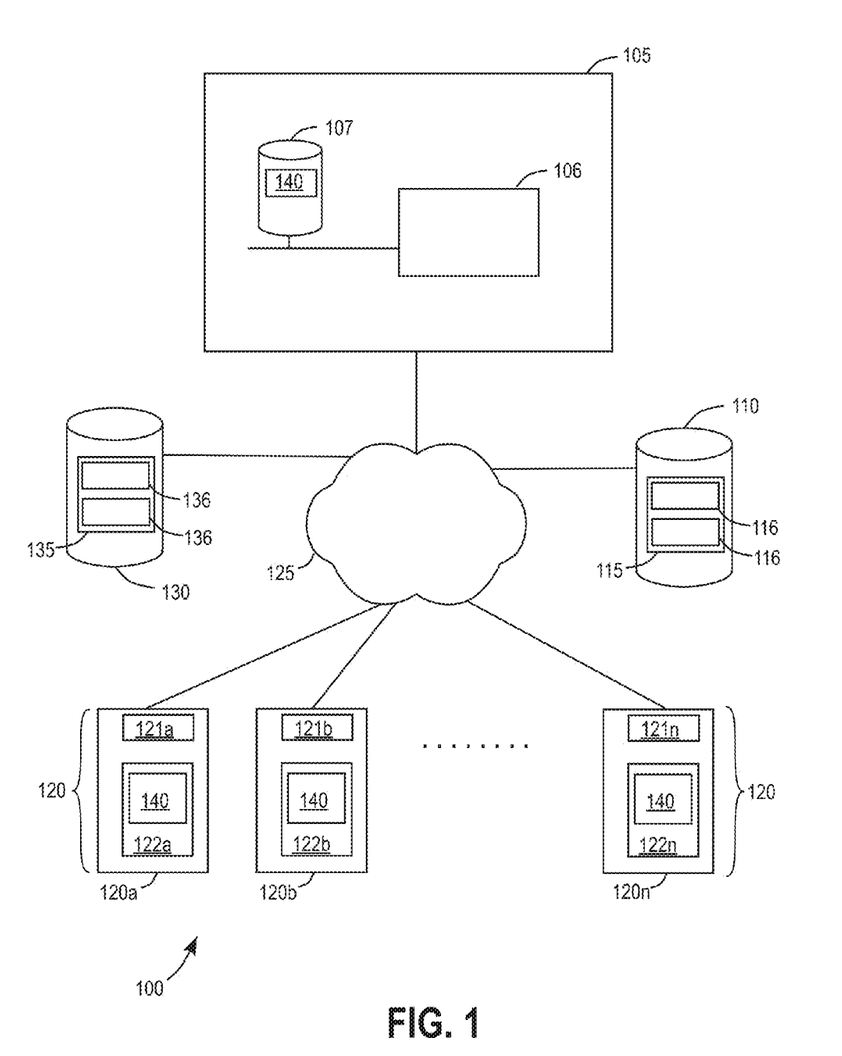
FIG. 1 is a simplified schematic of a computer system according to one embodiment of the present invention.

FIG. 1 is a simplified schematic of a computer system 100 according to one embodiment of the present invention. Computer system 100 includes a server computer 105, a computer storage 110 configured store a database 115, a set of user computers 120, a computer storage 130, a user database 135, and a computer network 125 communicatively linking server computer 105 and the set of user computers 120. Each user computer is labeled with the base reference numeral 120 and an alphabetic suffix. A set as referred to herein may include one or more elements. Computer network 125 may link server computer 105 to computer storage 110, and may link the user computers to computer storage 130. Computer network 125 may include one or more intranets, the Internet, or the like. Various portions of computer network 125 may not be accessible to other portion of the computer network. For example, various intranets included in computer network 125 might not be accessible to various other intranets included in computer network 125.

Server computer 105 may be configured to operate a server operating system and may include set of processors 106 and a non-transitory memory 107. Non-transitory memory 107 may be configured to store computer code that may be executable by the set of processors 106 of server computer 105 or executable by other server computers. Each user computer may be a desktop computer, a laptop computer, or the like. Further, each user computer may include a set of processors 121 (the processors are labeled 121a, 121b . . . 121n in FIG. 1) and a non-transitory memory 122 (the non-transitory memories are labeled 122a, 122b . . . 122n in FIG. 1) on which computer code may be stored. The computer code stored on a non-transitory memory 122 may be executable by an associated processor 121 of a user computer. A non-transitory memory may include semiconductor memory, optical memory, magnetic memory, or the like. The computer code stored on non-transitory memories 107 and 122 may encode the computer methods described herein and during operation a processor may carry out the steps of the computer method embodiments described herein.

According to one embodiment, server computer 105 is a business-objects server configured to store, modify, and access business objects 116 in database 115. According to a further embodiment, server computer 105 is an advanced business application programming (ABAP) application server, which is a specific type of business-objects server. ABAP is a high-level programming language created by SAP AG of Germany, and is a language that may be used for programming the server computer for building applications that provide services, such as building business applications.

According to one embodiment, via server computer 105, a user computer, such as user computer 120a, is configured to access and/or modify the business objects stored in database 115. The user computers may be computers operated by a business, government body, or the like (referred to herein generally as users) where the user is a customer of another business operating server 105 and database 115. Database 115 may be configured to store the user's business data or the like and the server computer may be configured to provide applications configured to operate on the stored business data. The user computers may access business data in database 115 via messages transmitted from the user computers to the server computer. For example, messages may be transmitted from an application operating on the user computer to an application operating on the server computer for accessing business objects stored in database 115. Messages are one type of artifact generally used for accessing a database. Numerous other artifacts are also typically required to access database 115 as will be well understood by those of skill in the art. For example, prior to using a message at run time, a message type and a message specification are defined at run time or design time. The specification for the message is one example of another artifact generally needed before a message can be issued. Additional artifacts generally used for database access include the process agents configured for packing and unpacking messages and the like.

According to one embodiment of the present invention, a set of user tools 140 is provided for operation by a user on a user computer (e.g., user computer 120a) where the set of user tools is configured for use at a development stage of a user process so that a user may specify a business object (i.e., a target business object), which are stored in database 115 and which the user would like to access and/or modify at a run time of the user process. For example, the set of user tools 140 may be configured to allow a user to specify a process for: i) storing data in a target business object from a source business object, ii) reading data from the target business object for various purposes, such as for use in an application, iii) printing, iv) a query definition, v) an XML file input, vi) internal communications, vii) external communication, viii) formatting (e.g., formatting a PDF document), or the like. The set of user tools 140 may also be configured to allow the user to select the source business object. The source business objects 136 may business objects that are stored in the user database 135 in the computer storage 130.

The set of user tools may be configured for allowing a user, via a user computer, to specify a data mapping of data from the source business object to the target business object. The data mapping may be specified at design time of the user process for use at run time of the user process. According to one specific embodiment, the set of user tools may be configured to allow a user to specify a data mapping (e.g., for the storage) of data from a source business object to a target business object where the nodes of the two business objects are not the same. For example, the source business object may be flat and the target business object may include a plurality of nodes.

According to one embodiment of the present invention, the data mapping specified by a user at design time may be stored in a set of SADL (Service Adaptation Definition Language) files, which in particular embodiments of the present invention may include XML files. The data mapping specification may be stored in other file formats according to alternative embodiments. The set of user tools operating on a user computer, or a portion of the set of user tools operating on a server computer, may be configured to generate the set of SADL files from the data mapping specified by the user via the set of user tools. According to one embodiment, the set of SADL files may be stored by the server computer in a database of artifact resources. The SADL files are artifacts used for the user process specified by the user via the set of user tools. All other artifacts (not including the set of SADL files) required for the user process are generated by the user computer or the server computer operating the set of user tools or other applications specifically configured to generate the other artifacts. As described above, other artifacts that may be required for a user process may include a message type, process agent specifications and operations, etc. These other artifacts (i.e., artifacts that are exclusive of the set of SADL files) may be generated without a user's specific knowledge of the generation of the artifacts, the use of the artifacts, specific details of the artifacts, etc.

The set of SADL files may be a primary artifact for the sender side (e.g., for initiation of a user process, such as a user computer initiating a user process) and the receiver side (e.g., the server computer accessing and/or modifying the target business object in the database). The set of SADL files may also store information for a selection of the source business object structure and may store information for a selection of the target business object structure. That is, the data mapping specified by the set of SADL files may specify two mappings for: 1) mapping source business object data from a source business object to a message (i.e., a first mapping) and 2) mapping source business object data from the message to a target business object (i.e., a second mapping). The set of SADL files may include a first SADL mapping file for the first mapping and a second SADL mapping file for the second mapping. The first mapping of the first SADL mapping file may be for a canonical mapping of the source business object to the message. That is, the first mapping may be a one-to-one mapping where the structure of the source business object is maintained by the message. The second mapping of the second SADL mapping file may preserve the hierarchical structure (also referred to as a node structure) of the target business object and include the data mapping of data from the source business object to the target business object as specified by a user via the user computer operating the set of user tools. As described above the source business object and the target business object may have different node structures (e.g., flat, multiple nodes, etc.) and the hierarchy structure of the second SADL file represents the differences in the node structures so that data from the source business object may be mapped as specified by the user to the target business object.

Figure 2:
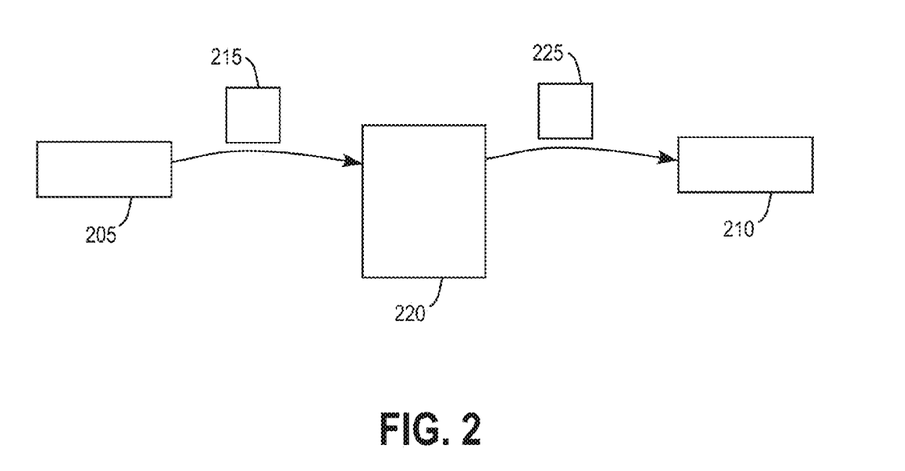
FIG. 2 is a simplified schematic of a mapping model that shows the mapping of source business object data of the source business object to target business object data of the target business object.

FIG. 2 is a simplified schematic of a mapping model that shows the mapping of source business object data of a source business object 205 to target business object data of the target business object 210. A first SADL file 215 (e.g., an XML file) may include the one-to-one mapping of source business object 205 to a message 220 (e.g., an XML message). A second SADL file 225 (e.g., an XML file) may include a model for the preserving the hierarchical mapping of the source business object data of source business object 205 to the hierarchy of nodes of target business object 210.

As described briefly above, a user computer, for example, user computer 120*a* is configured to operate the set of user tools 140 configured to allow a user to identify business objects for mapping and to identify user processes that may access the business objects via user computer 120*a*, for example, and via the server computer 105. Also as briefly as described above, the set of user tools 140 may also operate in part on server computer 105. The set of user tools may be served to the user computer by server computer 105 or another server computer over network 125. The portion of the set of user tools 140 operating on the user computer may be a front end of the set of user tools operating on server computer 105 and may provide a user interface for the set of user tools on the user computer. The set of user tools are sometimes referred to as a wizard as the set of user tools may be configured to guide a user through steps for identifying business objects and user processes.

Figure 3A:
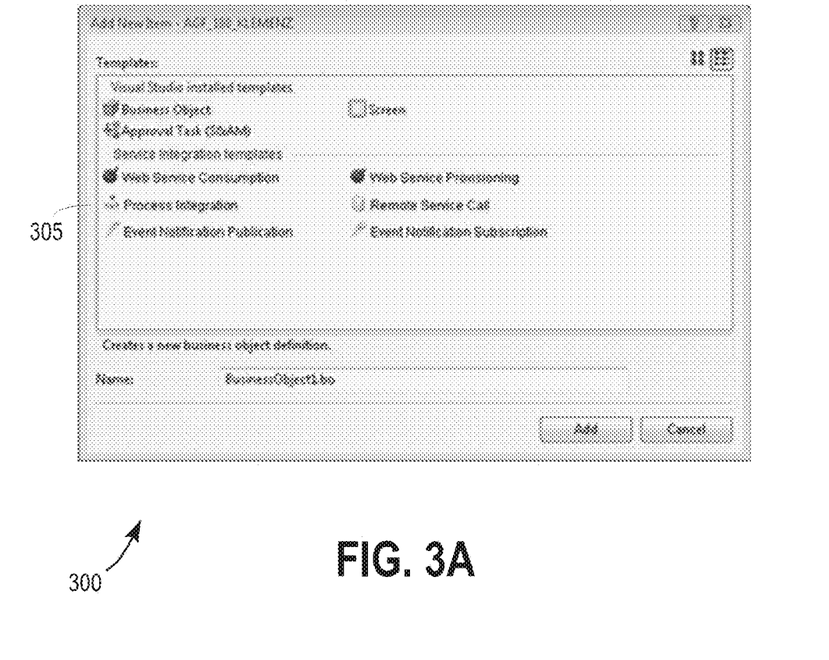
FIG. 3A is a simplified schematic of a first user interface configured to provide user selectable options for identifying a process for process integration.
Figure 3B:
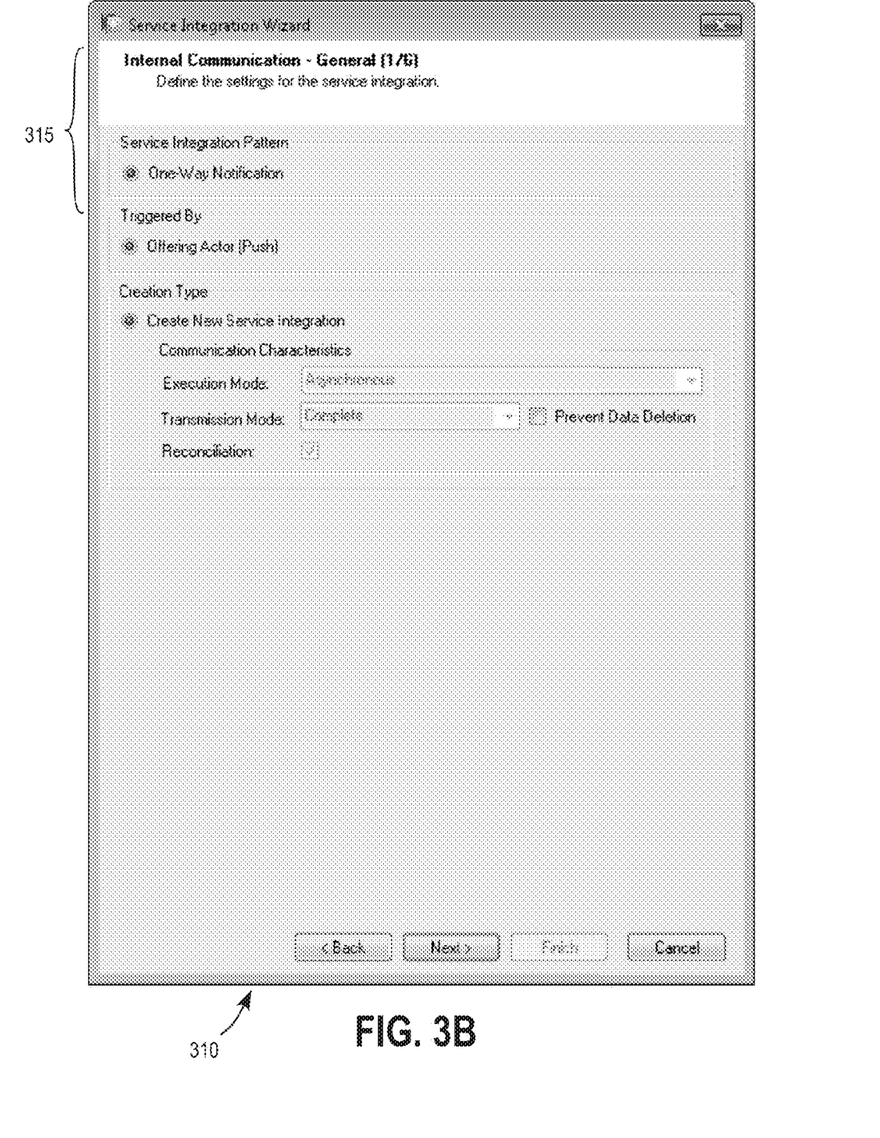
FIG. 3B is a simplified schematic of a second user interface configured to provide user selectable options for a use case.

FIGS. 3A-3G show example user interfaces that may be provided by the set of user tools on a user computer for user interaction for identifying business objects and identifying a user process in which the identified business objects may be accessed and/or modified. FIGS. 3A-3G are described in combination with FIG. 4, which is a high-level flow diagram of a computerized method for generating a data mapping according to one embodiment of the present invention. The high-level flow diagram is exemplary and various steps of the computerized method may be added and/or combined without deviating from the purview of the method as will be understood by those of skill in the art. If will also be readily apparent that some steps in the computerized method may be switched (e.g., steps 405 and 410 described below) without deviating from the purview of the method as will be further understood by those of skill in the art. FIG. 3A is a simplified schematic of a first user interface 300 configured to provide user selectable options for identifying a user process 305 for process integration. FIG. 3B is a simplified schematic of a second user interface 310 configured to provide user selectable options for a use case 315. The example use case is for an internal communication (application to application (A2A) communication) or for process integration. Other user selectable use cases may include: external communication (e.g., with a third party, such as for a business to business (B2B communication), a web service consumption, an event publication, and an event subscription (step 400). The second user interface may be configured to allow a user to specify an integrations pattern for the user process where the integration process may be for a one-way notification, a request/confirmation, or a late request. The second user interface may also allow a user to specify whether the identified user process is new or existing.

Figure 3C:
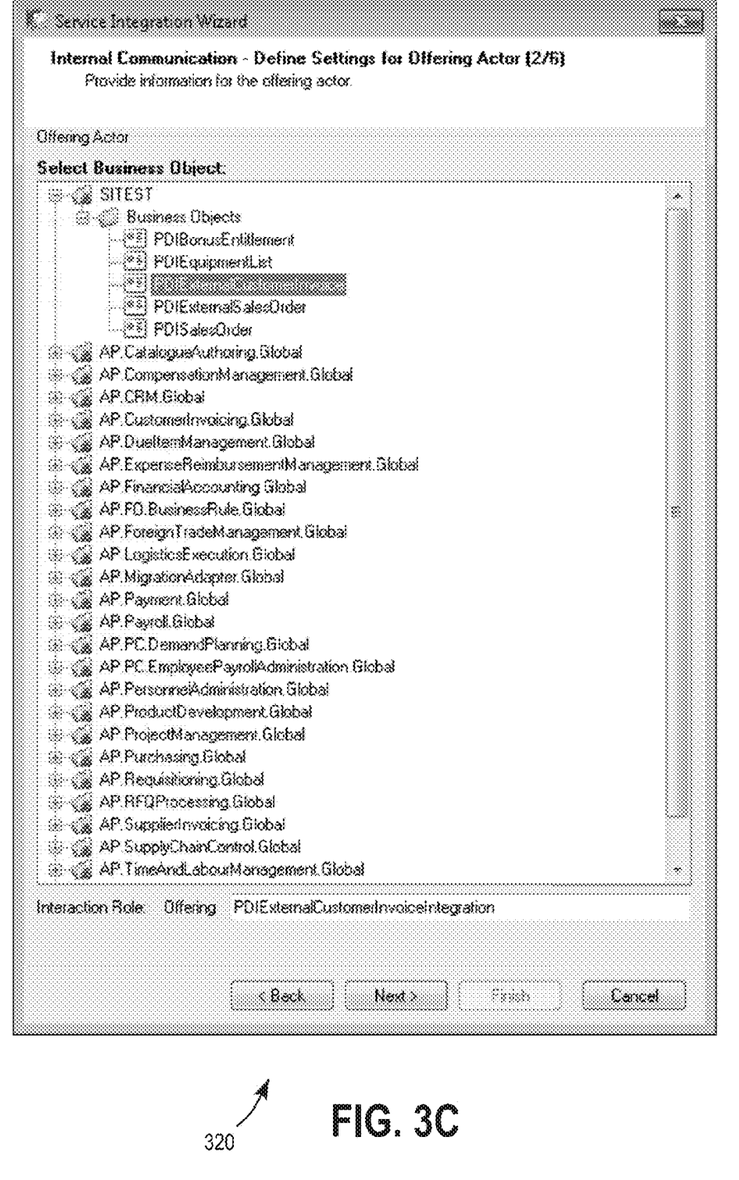
FIG. 3C is a simplified schematic of a third user interface that is configured to provide user selectable options for choosing a target/receiving business object for the user process for an offering actor.
Figure 4:
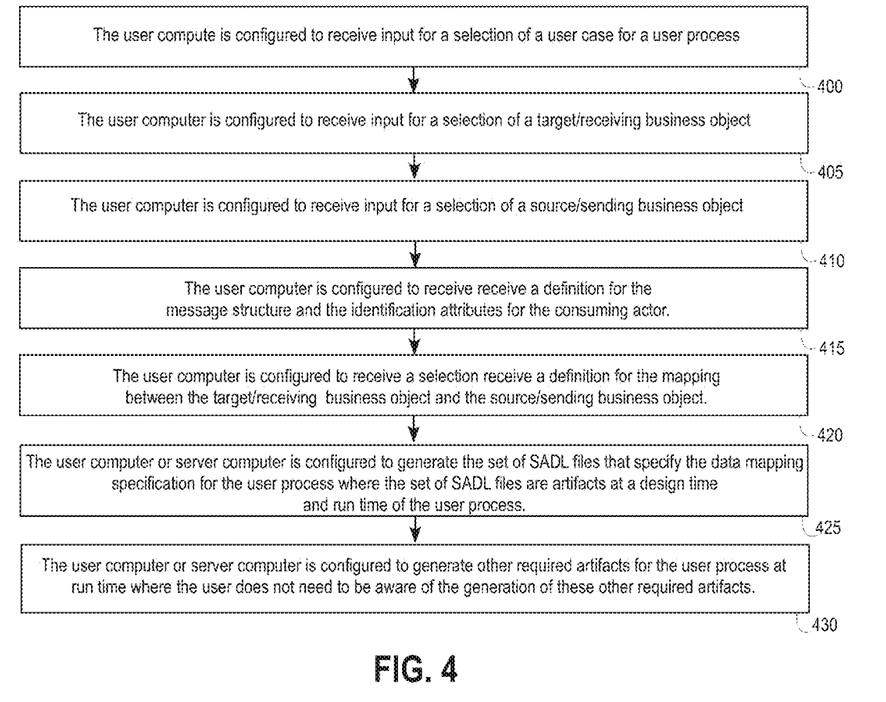
FIG. 4, which is a high-level flow diagram of a computerized method for generating a data mapping according to one embodiment of the present invention.

FIG. 3C is a simplified schematic of a third user interface 320 that is configured to provide user selectable options for choosing a target/receiving business object for the user process (step 405) for an "offering actor." Third user interface 320 may be configured to allow for the selection of a target/receiving business object via a root node. Alternative embodiments may be configured to provide user selectable options for selecting sub-nodes of a target/receiving business object. At a step 405, the user computer, via the set of user tools, is configured to receive input for a selection of a target/receiving business object.

Figure 3D:
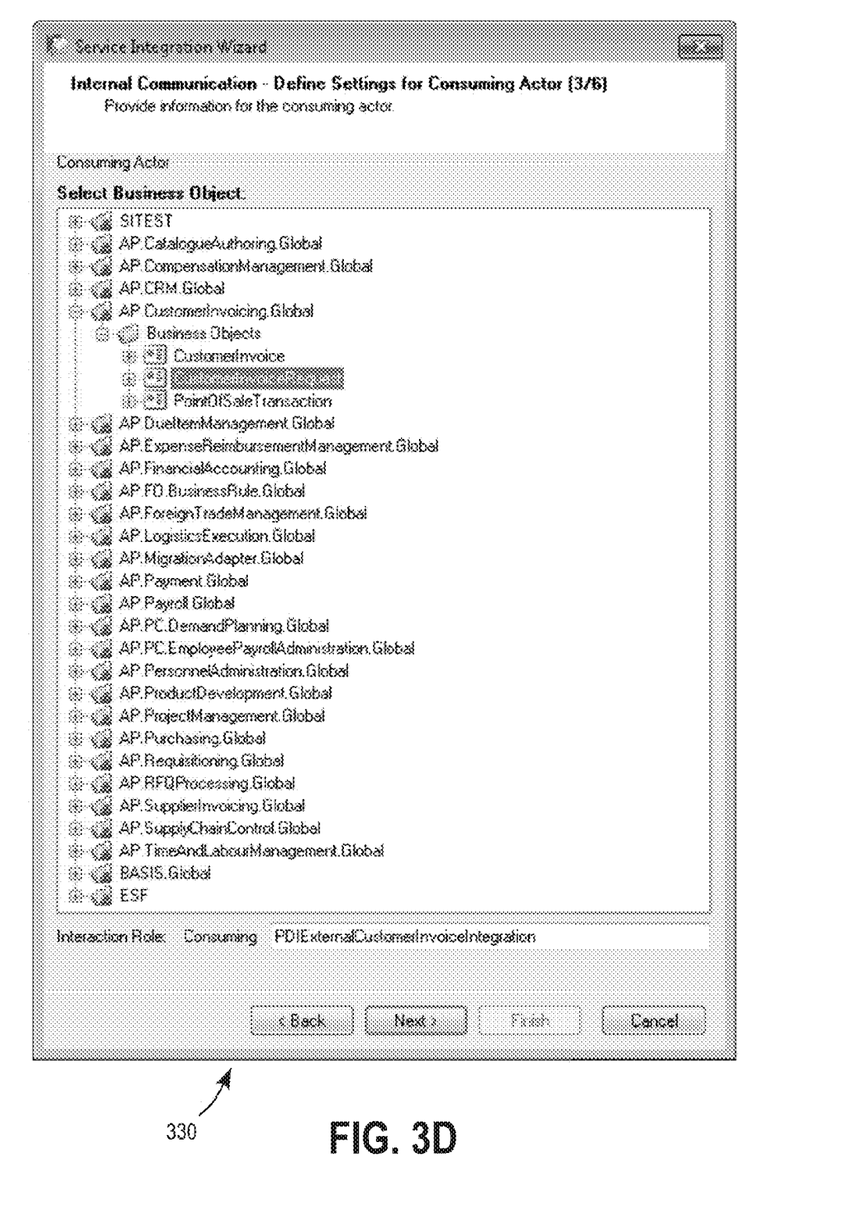
FIG. 3D is a simplified schematic of a fourth user interface that is configured to provide use selectable options for choosing a source/sending business object for the user process for a consuming actor.

FIG. 3D is a simplified schematic of a fourth user interface 330 that is configured to provide use selectable options for choosing a source/sending business object for the user process for a "consuming actor." Fourth user interface 330 may be configured to allow for the selection of a source/sending business object via a root node. Alternative embodiments may be configured to provide user selectable options for selecting sub-nodes of a source/sending business object. At a step 410, the user computer, via the set of user tools, is configured to receive input for a selection of a source/sending business object.

Figure 3E:
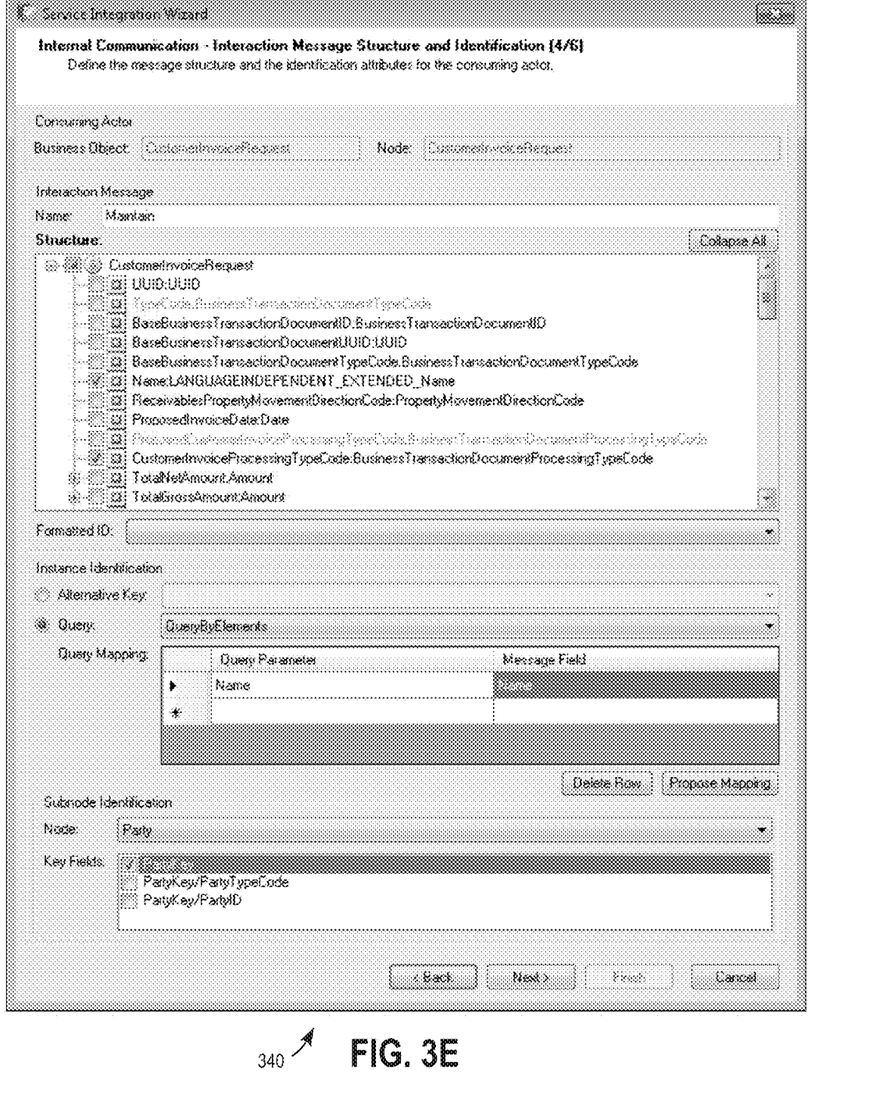
FIG. 3E is a simplified schematic of a fifth user interface configured to provide user selectable options for defining the message structure and the identification attributes for the consuming actor.

FIG. 3E is a simplified schematic of a fifth user interface 340 configured to provide user selectable options for defining the message structure and the identification attributes for the consuming actor. The fifth user interface represents the first SADL setting up the structure of the message based from the target/receiving business object. At a step 415, the user computer, via the set of user tools, is configured to receive the definition for the message structure and the identification attributes for the consuming actor.

Figure 3F:
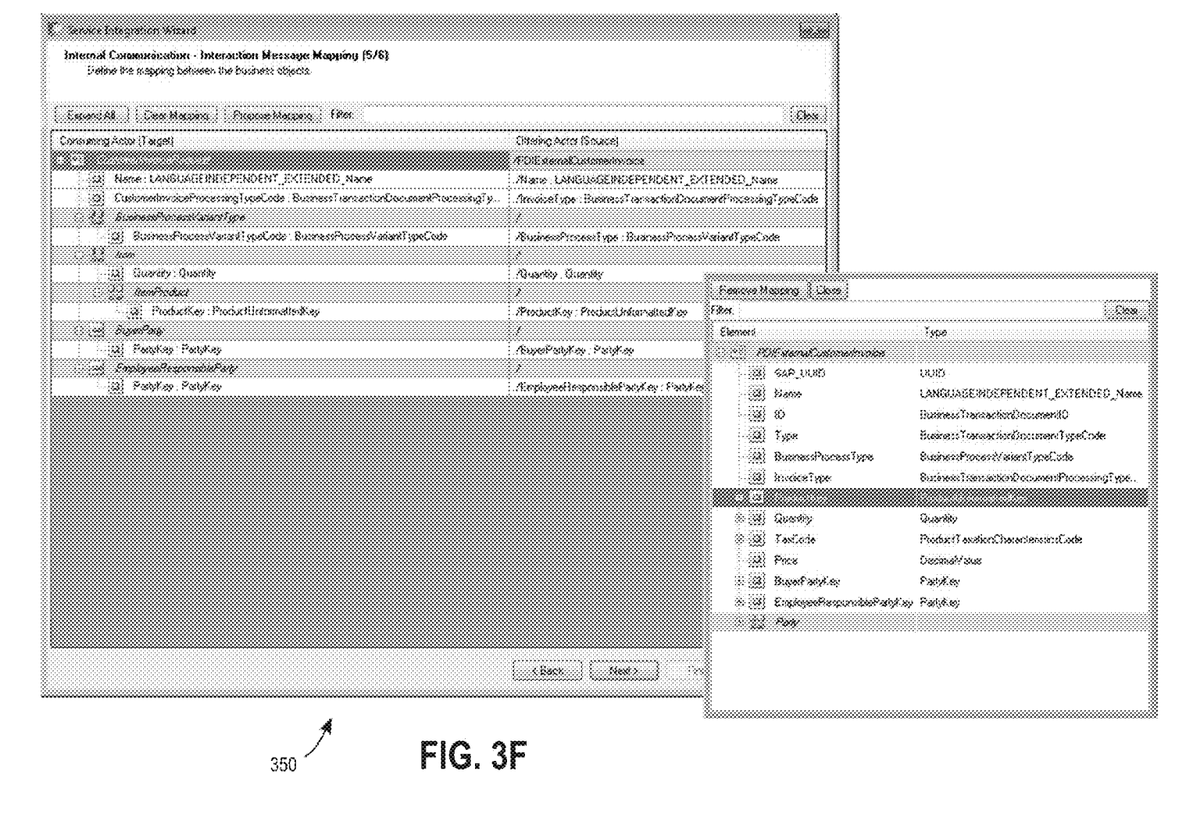
FIG. 3F is a sixth user interface that may be displayed on the user computer by the set of user tools and may be configured for defining the mapping between the target/receiving business object and the source/sending business object.

FIG. 3F is a sixth user interface 350 which may be displayed on the user computer by the set of user tools and may be configured for defining the mapping between the target/receiving business object and the source/sending business object. This sixth user interface represents the second SADL for mapping from the source/sending business object to the target/receiving business object. At a step 420, the user computer, via the set of user tools, is configured to receive a definition for the mapping between the target/receiving business object and the source/sending business object.

Figure 3G:
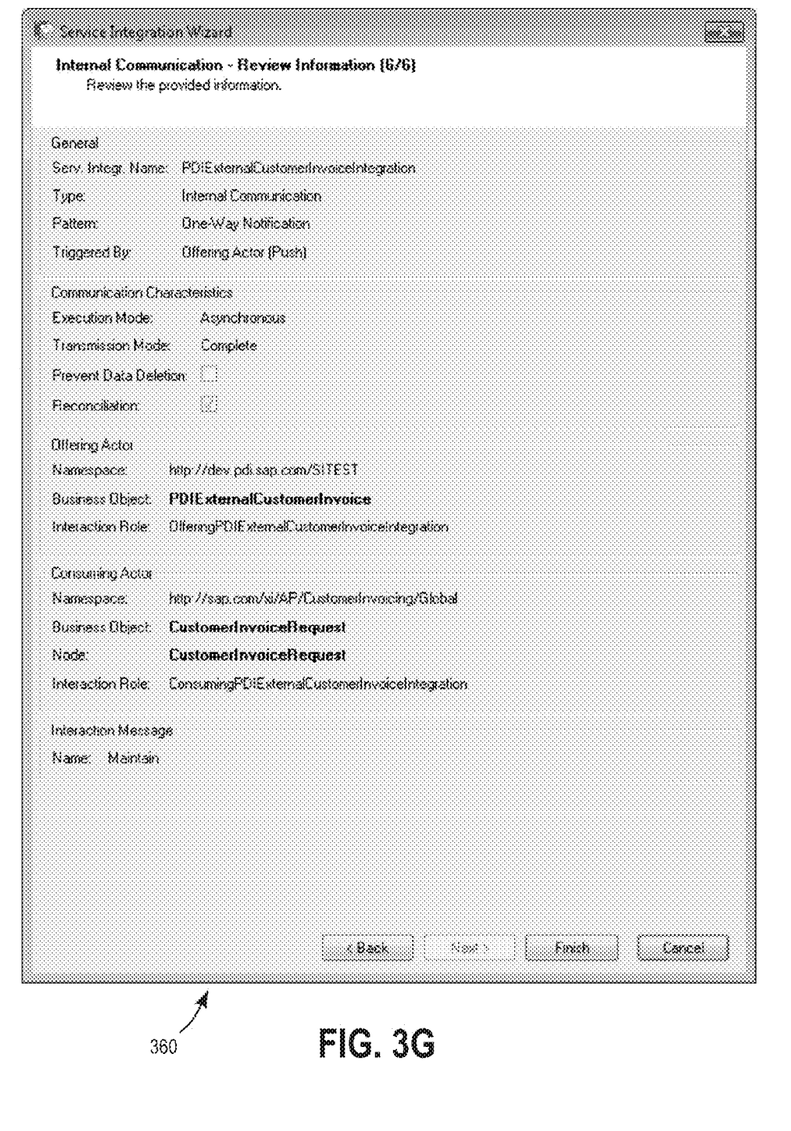
FIG. 3G is a seventh user interface that may be displayed on the user computer by the set of user tools after a mapping from the source/sending business object to the target/receiving business object is specified where the seventh user interface may display a summary of the data mapping.

FIG. 3G is a seventh user interface 360 which may be displayed on the user computer by the set of user tools after a mapping from the source/sending business object to the target/receiving business object is specified where the seventh user interface may display a summary of the data mapping and may provide a user selectable option (e.g., "finish" button) so that the data mapping may be analyzed (e.g., by the user computer and/or the sever computer) for generation of the first and the second SADL mapping files (step 425), and for generating the other required artifacts for execution of the user process (step 430) where the user does not have to aware of the generation of the other required artifacts. In the traditional development of process a developer generally generates substantially all of the artifacts required to execute a process. It will be understood that the user interfaces described above are exemplary and other user interfaces may be provided for defining a data mapping.

According to one embodiment of the present invention, during execution of the user process defined by a user using the set of user tools, the SADL files are configured for use as run time artifacts. The user process may be triggered (e.g., executed) by a variety of events, such as an event occurring in an application operating on the user computer or an event occurring in an application operating on the server computer. FIG. 2 described above provides a simplified example of artifacts for a user process and may represent a user process at run time where the first and the second SADL files are used at run time by process agents for packing and unpacking a message for access or modification of a target business object.

Figure 5:
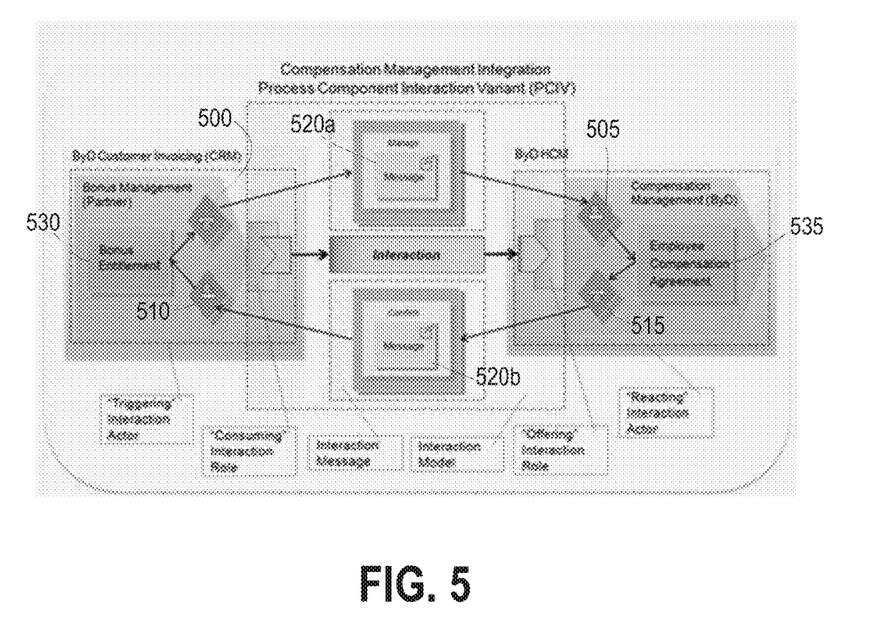
FIG. 5 is a further simplified schematic that represents a process at run time for a particular use case (e.g., A2A) of the present invention and shows various artifacts created a design time and/or run time that may be required for the process at run time.

FIG. 5 provides a further simplified schematic that represents a user process at run time for a particular use case (e.g., A2A) of the present invention and shows various artifacts created at design time and/or run time that may be required for the user process at run time. At run time outbound process agents 500 and 505 and inbound process agents 510 and 515 may operate according to the first SADL file and the second SADL file for packing messages 520*a* and 520*b*(i.e., creating XML messages) with source business object data of the source business object 530 or with target business object data of the target business object 535 and unpacking the messages. For example, message 520*a* may be packed with source business object data by outbound process agent 500 according to the first SADL file, and message 520*a* may be unpacked by inbound process agent 510 for accessing the target business object (e.g., for reading target business data from the target business object) and/or for modifying the target business object with the source business object data. As described above, the user specifying the data mapping between the source business object and the target business object may be unaware of the generation and use of these additional artifacts, such as the inbound and outbound process agents which may be created at design time and used at run time. Message 520*b* may be similarly packed and unpacked and by outbound process agent 510 and inbound process agent 515. The messages may be delivered by various methods between the user computer and the server computer.

As described briefly above, select steps of the foregoing method may be used in alternative use cases, such printing, which may include front-end printing and backend printing. Printing is a user case in which a single SADL may be used for mapping a source/sending business object for a message for printing. Various user interface may be provided by the set of user tools for form templates for printing. Similar to use cases, described above, the form templates may be used for defining a mapping for a single SADL file and other artifacts for printing may be generated by the user computer or the server computer where a user does not have to be aware of the generation of the other artifacts.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method, comprising:
receiving, by a server system, a request to generate a user defined process configured to map data from a source business object (BO) stored on a first database to a target BO stored on a second database at run time, wherein the request is received from a user computer system that has access to the first database but lacks access to the second database;
generating, by the server system, a first mapping file configured to map the source BO to a message;
generating, by the server system, a second mapping file configured to map the message to the target BO; and
generating, by the server system, a plurality of process agents configured to operate according to the first mapping file to pack the source BO to the message and to operate according to the second mapping file to unpack the message to the target BO,
wherein the plurality of process agents, the first mapping file, and the second mapping file are configured for use as run time artifacts of the user defined process.

2. The computer implemented method of claim 1, further comprising transmitting, by the server system, a user tool kit to the user computer system, the user tool kit being utilized by the user computer system to generate the request.

3. The computer implemented method of claim 1, wherein the source BO and the target BO are from different databases.

4. The computer implemented method of claim 1, wherein the server system has access to the source BO and the target BO.

5. The computer implemented method of claim 1, wherein the source BO has a node structure different than the target BO.

6. The computer implemented method of claim 1, wherein a structure for storing data in the source BO is maintained by the message.

7. The computer implemented method of claim 1, wherein the second mapping file preserves the hierarchical structure of the target BO.

8. A non-transitory computer readable storage medium storing one or more programs, the one or more programs comprising instructions for:
receiving a request to generate a user defined process configured to map data from a source business object (BO) stored on a first database to a target BO stored on a second database at run time, wherein the request is received from a computer system that has access to the first database but lacks access to the second database;
generating a first mapping file configured to map the source BO to a message;
generating a second mapping file configured to map the message to the target BO; and
generating a plurality of process agents configured to operate according to the first mapping file to pack the source BO to the message and to operate according to the second mapping file to unpack the message to the target BO,
wherein the plurality of process agents, the first mapping file, and the second mapping file are configured for use as run time artifacts of the user defined process.

9. The non-transitory computer readable storage medium of claim 8, further comprising transmitting a user tool kit to the computer system, the user tool kit being utilized by the computer system to generate the request.

10. The non-transitory computer readable storage medium of claim 8, wherein the source BO and the target BO are from different databases.

11. The non-transitory computer readable storage medium of claim 8, wherein the source BO and the target BO are accessible by the one or more programs.

12. The non-transitory computer readable storage medium of claim 8, wherein the source BO has a node structure different than the target BO.

13. The non-transitory computer readable storage medium of claim 8, wherein a structure for storing data in the source BO is maintained by the message.

14. The non-transitory computer readable storage medium of claim 8, wherein the second mapping file preserves the hierarchical structure of the target BO.

15. An apparatus, comprising:
one or more computer processors; and a non-transitory computer-readable storage medium comprising instructions, that when executed, control the one or more computer processors to be configured for:

receiving a request to generate a user defined process configured to map data from a source business object (BO) stored on a first database to a target BO stored on a second database at run time, wherein the request is received from a computer system that has access to the first database but lacks access to the second database;

generating a first mapping file configured to map the source BO to a message;

generating a second mapping file configured to map the message to the target BO; and generating a plurality of process agents configured to operate according to the first mapping file to pack the source BO to the message and to operate according to the second mapping file to unpack the message to the target BO, wherein the plurality of process agents, the first mapping file, and the second mapping file are configured for use as run time artifacts of the user defined process.

16. The apparatus of claim 15, further comprising transmitting a user tool kit to the computer system, the user tool kit being utilized by the computer system to generate the request.

17. The apparatus of claim 15, wherein the source BO and the target BO are accessible by the one or more computer processors.

18. The apparatus of claim 15, wherein the source BO has a node structure different than the target BO.

19. The apparatus of claim 15, wherein a structure for storing data in the source BO is maintained by the message.

20. The apparatus of claim 15, wherein the second mapping file preserves the hierarchical structure of the target BO.

* * * * *